United States Patent [19]

Takeuchi

[11] 3,747,151

[45] July 24, 1973

[54] CAR WASHING APPARATUS

[75] Inventor: Shigeo Takeuchi, Nagoya, Japan

[73] Assignee: Takeuchi Tekko Kabushiki Kaisha, Nagoya, Japan

[22] Filed: Jan. 3, 1972

[21] Appl. No.: 214,861

[52] U.S. Cl. .............................. 15/21 E, 15/DIG. 2
[51] Int. Cl. .............................................. B60s 3/06
[58] Field of Search ...................... 15/DIG. 2, 21 D, 15/21 E, 97

[56] References Cited
UNITED STATES PATENTS
3,601,833   8/1971   Takeuchi............................ 15/21 E

*Primary Examiner*—Edward L. Roberts
*Attorney*—Karl W. Flocks

[57] ABSTRACT

A car washing apparatus including a pair of vertically extending rotatable brushes which is mounted on a frame for transverse translational movement and for swinging movement in a longitudinal vertical plane, the transverse movement and the rotation of the brushes being started when the swinging movements of the brushes are detected.

5 Claims, 4 Drawing Figures

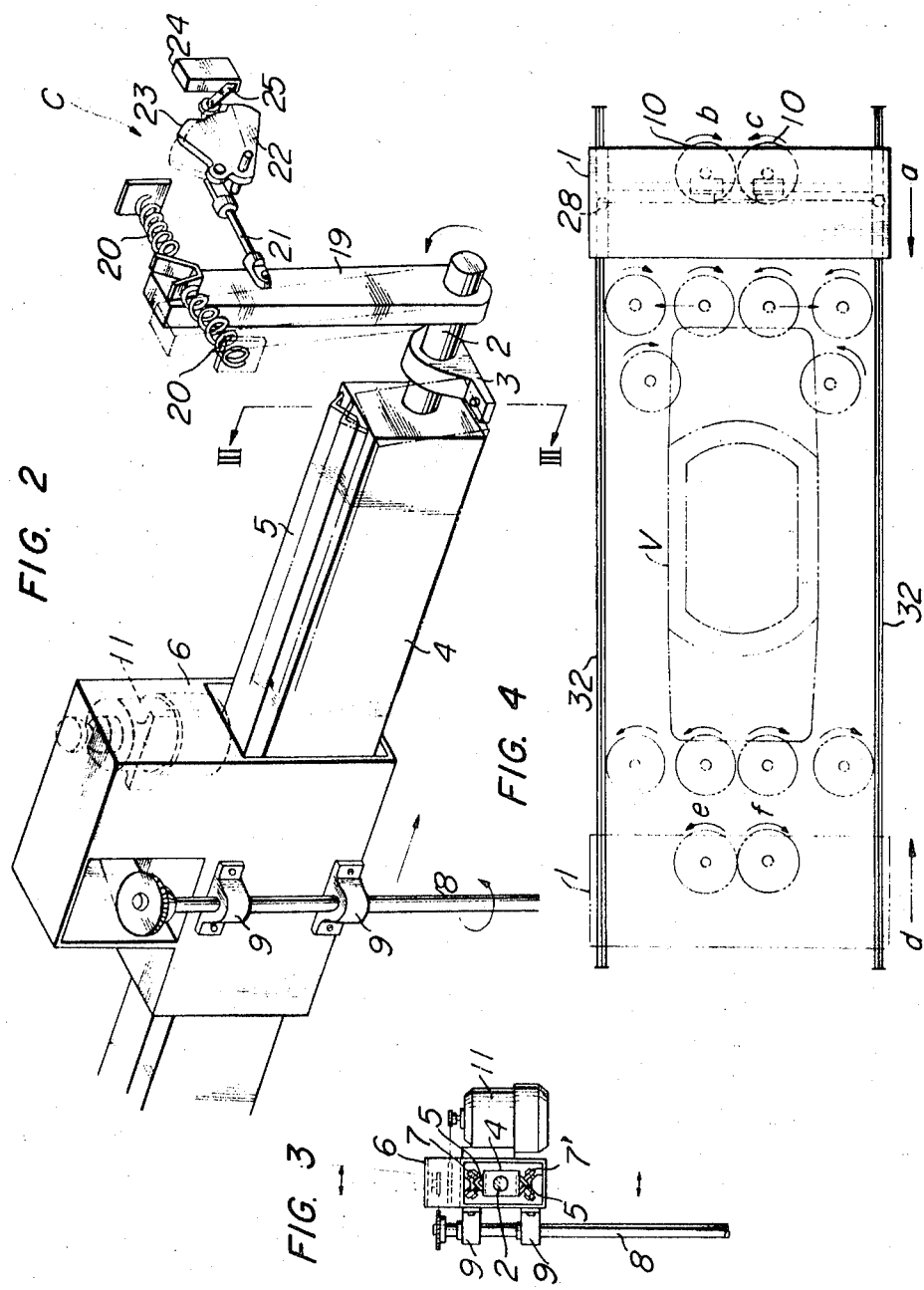

CAR WASHING APPARATUS

The present invention relates to a car washing apparatus having rotatable brush means and more particularly to brush actuating means for such an apparatus.

In a conventional car washing apparatus, a plurality of rotatable brushes are mounted on a stationary or movable frame and adapted to be put into washing contact with a car body. Usually in such an apparatus, front and rear surfaces of a car are washed by means of a horizontal brush which is rotatable about a horizontal axis and supported by swingable arms for vertical movement, while side surfaces of the car body are washed by a pair of vertical brushes which are rotatable about vertical axes and supported by horizontally swingable arms. However, such a conventional car washing apparatus cannot satisfactorily clean car body surfaces of complicated configuration and requires an increased space for allowing the movement of swing arms supporting each rotatable brushes.

The present invention has an object to eliminate the aforementioned disadvantages of the conventional car washing apparatus.

Another object of the present invention is to provide a compact yet effective car washing apparatus.

A further object of the present invention is to provide a car washing apparatus which has only a pair of vertical brushes for washing side surfaces as well as front and rear surfaces of a car body.

The above and other objects and advantages of the present invention can be attained by providing a car washing apparatus comprising a frame, a pair of vertical brushes, means for supporting the brushes for transverse translational movement and swinging movement in a longitudinal vertical plane, means for sensing the swinging movement of the brushes and starting the transverse movement of the brushes and means for biasing the brushes toward each other. According to a preferred aspect of the present invention, the frame is longitudinally movable, and means is provided for stopping the movement of the frame when the swinging movement of the brushes is sensed. The frame can thereafter be restarted to move in the longitudinal direction when the brushes are transversely moved until they are apart from each other by a predetermined distance.

The above and other features of the present invention will become clear from the following descriptions of a preferred embodiment thereof which will be explained with reference to the accompanying drawings, in which:

FIG. 2 is a fragmentary perspective view of brush support mechanism employed in the apparatus of FIG. 1;

FIG. 3 is an end view as seen in the direction of arrow A — A in FIG. 2; and

FIG. 4 is a plan view showing the apparatus of the present invention in use.

Figure 1:
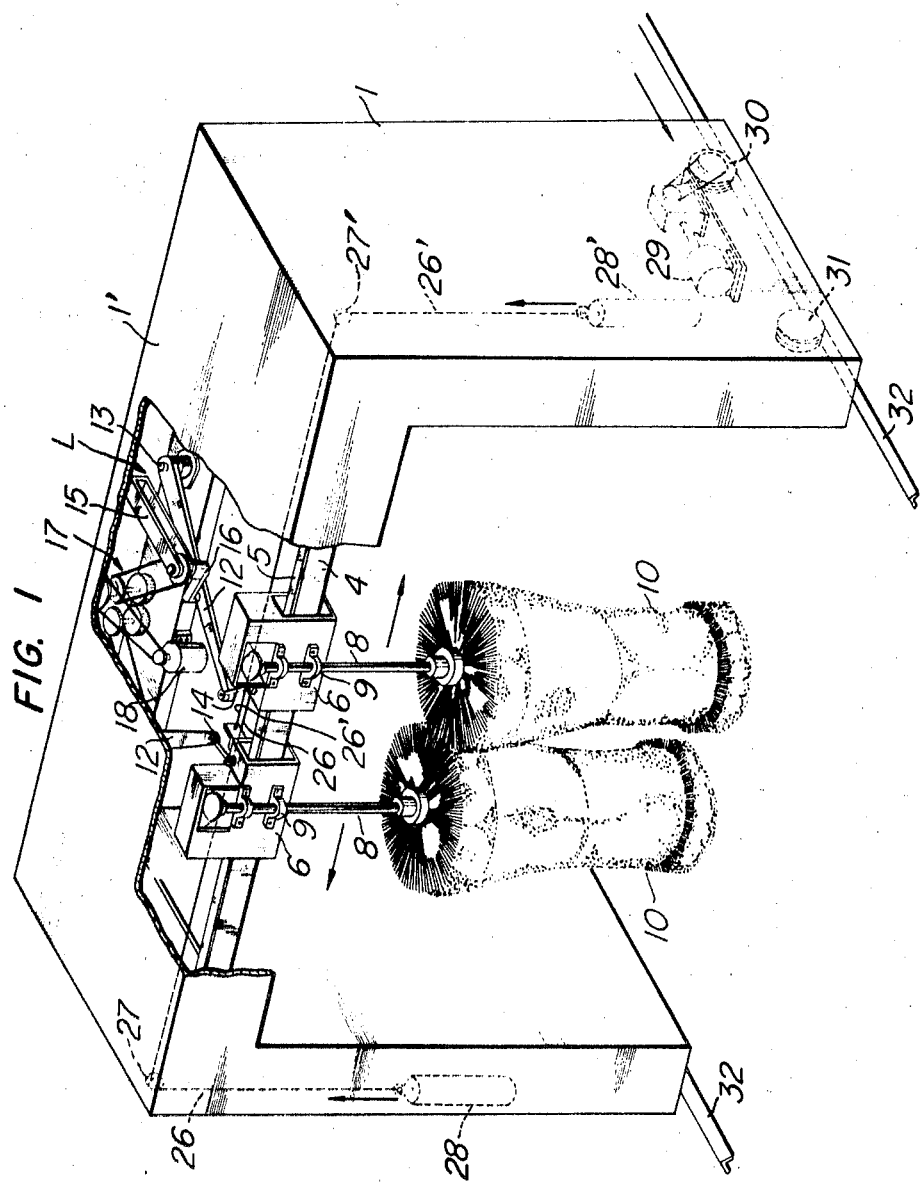
FIG. 1 is a perspective view of the car washing apparatus in accordance with the present invention.

Referring to the drawings, the present invention is shown as embodied in an apparatus having a frame which is movable along guide rail means and washing means mounted on the frame. The apparatus includes a frame (1) which is movable along a pair of parallel guide rails (32) and has a transversely extending shaft (2) mounted thereon by means of a pair of bearings (3). The shaft (2) supports a guide frame (4) of rectangular cross-section. A guide rail (5) is secured to each of the upper and lower surfaces of the guide frame (4) along the whole length thereof. A pair of movable brackets (6) are supported on the guide frame (4) and each has guide rollers (7) and (7') for engagement with the guide rails (5) so that the bracket is guided along the guide rails (5).

Each of the movable brackets (6) rotatably supports on its one side surface a vertical shaft (8) by means of a pair of bearings (9). At the lower end of the shaft (8), there is secured a brush (10) which may be of a conventional shape. Each of the vertical shafts (8) is in driving connection at its upper end through a transmission mechanism with a motor (11) mounted on the other side surface of the bracket (6). Thus, each of the brushes (10) can be rotated by the associated motor (11).

In order to move each of the movable brackets (6) along the guide frame (4), a driving linkage (L) is provided for each bracket at the roof portion (1') of the frame (1). If should be noted that both driving linkages (L) are identical in structure so that only one of them will be explained. The mechanism (L) has an actuating 0arm (12) pivotally supported at its one end for swinging movement in a horizontal plane as shown by the reference numberal (13). The other end of the arm (12) is connected with one end of a link (14) which is pivotally mounted at the other end to the bracket (6).

A bracket (15) secured to the roof portion (1') of the frame (1) swingably supports one end of a crank arm (16) which is in engagement at its free end with the intermediate portion of the actuating arm (12). The crank arm (16) is connected through a transmission mechanism (17) to a motor (18) so that the crank arm (16) is rotated by the motor (18) to swing the actuating arm (12). Thus, the bracket (6) is moved along the guide frame (4) through the link (14). The movement of the arm (12) is controlled by for example a limit switch (not shown) which is actuated by the arm. The motor (18) and the transmission mechanism may be so arranged that they simultaneously actuate both of the linkages (L).

Control means (C) for the motor (18) is provided one for each transverse end of the frame (1). Since both of the control means (C) are identical in structure, only one of them will be explained. Referring to FIG. 2, the support shaft (2) has a swing arm (19) secured at its lower end to one end of the shaft. The upper end of the arm (19) is connected with neutral spring means icluding a pair of compression springs (20). An actuating rod (21) is connected at its one end to the intermediate portion of the arm (19), the other end of the rod being connected to an eccentric sector plate (22). The sector plate (22) has a cam edge (23) for co-operation with an actuating arm (25) of a microswitch (24). When the brush (10) is brought into contact with a car body (V), the driving shaft (8) is caused in incline together with the bracket (6), the guide frame (4) and the support shaft (8), so that the swing arm (19) is also caused to swing as shown by an arrow in FIG. 2. Thus, the sector plate (22) is correspondingly rotated to actuate the switch (24). Therefore, the motor (18) is started.

Each of the movable brackets (6) is secured to one end of a cable (26) or (26') which is passed around a pulley (27) or (27') and has at the other end a counter balance weight (28) or (28'). Therefore, the pair of brakcets (6) are biased toward each other by the weights (28) and (28') to the position shown in FIG. 1.

Further, in the drawings, the reference numeral (29) designates a motor for driving the movable frame (1), a driven wheel (30), (32) an idler wheel (31), on a pair of guide rails.

The operation of the apparatus in accordance with the present invention will now be described. As shown in FIG. 4, a car body (V) is positioned between the rails (32). At this moment, the frame (1) is at the right end position as shown by solid lines in FIG. 4 and the brushes (10) are in central positions under the influence of the weights (28) and (28'). The motors (11) and (29) are then started to cause the frame (1) to move in the direction shown by an arrow (a) in FIG. 4 and, at the same time, to rotatingly drive the brushes (10) in the directions shown by arrows (b) and (c). As the frame (1) is advanced, the brushes (10) come into contact with the front surface of the car body (V) so that the brushes (10) are caused to incline due to a further advancing movement of the frame (1).

Thus, the shafts (8), the brackets (6) and the guide frame (4) are caused to swing as a unit producing a rotation of the support shaft (2). Thus, the arm (19) is swung against the action of the neutral spring (20) as shown by dotted lines in FIG. 2. Therefore, the rod (21) is pulled to turn the sector plate (22) until the microswitch (24) is closed.

It should be noted that, in this mechanism, the angle of rotation of the support shaft (2) is amplified by the swing arm (19) so as to give a substantial rotation to the sector plate (22). Therefore, the limit switch (24) is positively actuated through a small inclination of the brushes (8). Further, the neutral spring (20) serves to absorb any shock load which may be produced when the brushes (10) are brought into abutting engagement with the car body.

When the limit switch (24) is actuated as descrbed above, the motor (29) is stopped and at the same time the motor (18) is started. Thus, the frame (1) is stopped and the driving linkages (L) are operated. The motor (18) drives the crank arms (16) through the transmission mechanism (17), so that the arms (12) are turned outwardly to move the brackets (6) outwardly along the guide rails (5) on the guide frame (4). Therefore, the brushes (10) are caused to move outwardly washing the front surface, front grill and front bumper of the car (V).

When the arms (12) are swung outwardly to the maximum extent, a limit switch (not shown) is actuated so as to restart the motor (29). Thus, the frame (1) is again started to advance.

As the motor (18) continues to rotate, the crank arm (16) is rotated independently from the arm (12) and a limit switch (not shown) is provided so that the motor (18) is stopped when the crank arm (16) reaches the initial position shown in FIG. 1.

As the brushes (10) are moved from contact with the front surface of the car body, the guide frame (4) and the movable brackets (6) are returned to the initial position by the action of the neutral spring (20) so that the brushes (10) are returned to the vertical position.

Since the brackets (6) are biased toward each other by the weights (28) and (28'), the brushes (10) are forced into washing contact with the side surfaces of the car body with appropriate contact pressure. When the frame (1) comes to the left end position in FIG. 4, the motor (29) and (11) are stopped. A similar operation is performed by moving the frame (1) in the reverse direction as shown by an arrow (d) and rotating the brushes in the directions shown by arrows (e) and (5). When the frame (1) reaches the right end position in FIG. 4, the motors (29) and (11) are stopped and the whole cycle of operation is completed.

In the above embodiment, the movable brackets (6) are explained as being inwardly biased by the weights (28) and (28'), however, a similar biasing means such as spring means may also be employed. Further, it should be noted that the present invention is also effective when it is applied to an apparatus having a stationary frame instead of a movable frame. Other modifications may also be made to the details of the illustrated arrangement without departing from the scope of the present invention.

I claim:

1. A car washing apparatus comrpising a main frame movable along a pair of guide rails disposed on ground, a transverse guide frame mounted on said main frame and rotatable about its own axis, a pair of brackets mounted on said guide frame and movable therealong, a rotatable brush vertically suspended by each of said brackets, means for rotating said brushes, means for moving said brackets transversely outwardly along said guide frame, menas for biasing said brackets toward each other, a swing arm connected to one end of the guide frame and adapted to actuate a microswitch when the guide frame is rotated about its axis for controlling the movement of the brackets and the rotation of the brushes.

2. A car washing apparatus in accordance with claim 1 in which said swing arm is connected with one end of a rod which is in turn connected at the other end with a sector member having a cam surface for acutating the microswitch.

3. A car washing apparatus in accordance with claim 1, in which the transverse movement of said brackets and the rotation of said brushes are started when the brushes are caused to incline by being abutted to a car body, and means being provided for stopping the transverse movement of the brackets when they reach the extreme outboard end of their travel.

4. A car washing apparatus in accordance with claim 1, in which said means for moving the brackets includes a swingable member connected to each of the brackets, and a crank member adapted to be driven by a motor and engageable to the swingable member for transmitting the power from the motor.

5. A car washing apparatus in accordance with claim 1 in which said biasing means comprises a suspended weight for each bracket.

* * * * *